(12) United States Patent
Kunimori et al.

(10) Patent No.: US 6,652,201 B2
(45) Date of Patent: Nov. 25, 2003

(54) BALL END MILL

(75) Inventors: Nagatoshi Kunimori, Itami (JP); Yasuyuki Kanada, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 50 days.

(21) Appl. No.: 09/783,222

(22) Filed: Feb. 15, 2001

(65) Prior Publication Data

US 2001/0051076 A1 Dec. 13, 2001

(30) Foreign Application Priority Data

Feb. 18, 2000 (JP) .................................. 2000-040946
Jan. 17, 2001 (JP) .................................. 2001-009062

(51) Int. Cl.$^7$ .......................... B23B 27/16; B26D 1/12
(52) U.S. Cl. .......................... 407/35; 407/42
(58) Field of Search .................. 407/119, 120, 407/42, 54, 34, 61, 63; 408/144, 145; 501/96.4

(56) References Cited

U.S. PATENT DOCUMENTS

| 4,437,800 A | * | 3/1984 | Araki et al. ............... 144/241 |
| 4,934,881 A | * | 6/1990 | Tsujimura et al. ......... 407/118 |
| 5,020,394 A | * | 6/1991 | Nakamura et al. ......... 407/118 |
| 5,188,487 A | * | 2/1993 | Okawa et al. ............. 407/119 |
| 5,326,195 A | * | 7/1994 | Brox .......................... 407/32 |
| 5,685,671 A | * | 11/1997 | Packer et al. ............. 407/118 |
| 5,725,333 A | * | 3/1998 | Abe et al. .................. 407/118 |
| 5,979,912 A |   | 11/1999 | Cook |
| 6,022,175 A | * | 2/2000 | Heinrich et al. ........... 407/118 |
| 6,174,111 B1 | * | 1/2001 | Anjanappa et al. ........ 408/1 R |
| 6,331,497 B1 | * | 12/2001 | Collier et al. ............. 407/119 |

FOREIGN PATENT DOCUMENTS

| EP | 0413227 A2 | 2/1991 |
| EP | 03060909 | 3/1991 |
| JP | 6-190610 | 7/1994 |

* cited by examiner

*Primary Examiner*—Willmon Fridie, Jr.
(74) *Attorney, Agent, or Firm*—Foley & Lardner (57) ABSTRACT

The purpose is to improve the surface roughness Rz of a cut surface to 1.6 μm or under in cutting e.g. hardened steel. The ball end mill has a cutting blade made of a polycrystalline hard sintered material containing 20 to 95 vol % of cubic boron nitride. The cutting blade has a ridge portion having a radius of curvature of 5 to 30 μm. A flank and a rake face or a negative land of the cutting blade connect smoothly with the ridge with the radius of curvature. The ridge portion of the cutting blade has a surface roughness of 0.1 to 1.0 μm in terms of 10-point average roughness (Rz).

20 Claims, 4 Drawing Sheets

PRIOR ART

FIG. 5B

PRIOR ART

BALL END MILL

BACKGROUND OF THE INVENTION

The present invention relates to a ball end mill used to machine ball grooves of constant-velocity joints, etc. and particularly to the shape of cutting blades of a ball end mill made of a polycrystalline hard sintered material containing cubic boron nitride.

Materials formed by sintering fine cubic boron nitride powder by use of various kinds of binders exhibit excellent properties for the machining of high-hardness iron-base metals and cast iron. If a cutting tool made of a cubic boron nitride sintered material is used for the machining of a hardened steel material which has an especially high hardness, finished surface roughness and dimensional accuracy equivalent to those by grinding are obtained. Thus, part of the cutting of hardened steel is being changed from cutting using a conventional grinder to cutting using a cutting tool of cubic boron nitride sintered material.

In contrast, the field in which precision cutting is the most advanced is in the cutting of non-ferrous metals using single-crystal diamond. Its major application is machining of aluminum alloys such as memory disk boards and polygonal mirrors. Recently, there is a tendency to replace such single-crystal diamond with a less expensive and easy-to-machine polycrystalline diamond. With polycrystalline diamond tools, if large irregularities are formed at the ridge of a cutting blade due to steps at the crystal interface, they cannot be removed even if the rake face and flank are ground. Thus such irregularities remain on the ground surface and are transferred onto the workpiece. Thus no accurate machining was possible.

With a polycrystalline diamond cutting tool disclosed in Japanese patent publication 6-190610, this problem is solved by chamfering its cutting edge. It discloses forming the flank of the cutting edge of a cutting insert made of polycrystalline diamond into a ground surface having no grinding marks, and providing a small-width chamfer on the ridge of the cutting blade by grinding to smoothen the ridge of the cutting blade. But with a polycrystalline diamond tool, since carbon forming the diamond reacts with steel, it cannot be used for the cutting of hardened steel and cast iron.

The housing and ball grooves of a constant-velocity joint made of carbon steel such as S50C are, after rough machining, subjected to heat treatment to a hardness of HRC 50-60. The ball grooves, which are formed diagonally in the housing, are required to be formed to narrow geometric tolerance and sphericity with high accuracy by finishing. Even if the material and shape of the cutting blades of a ball end mill correspond to a hard, heat-treated workpiece, a side lock type ball end mill is not preferable which is joined to a collet holder as shown in FIG. 5.

Figure 5A:
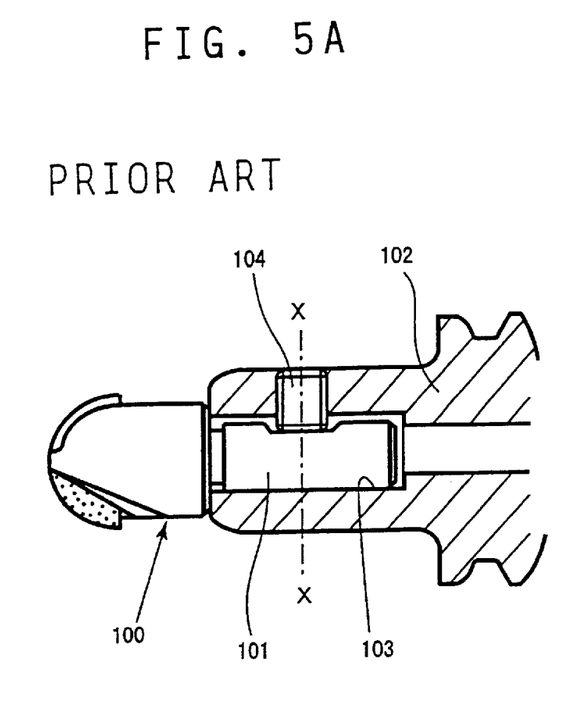
FIGS. 5A and 5B are sectional views of a conventional side lock type ball end mill with a collet holder.
Figure 5B:
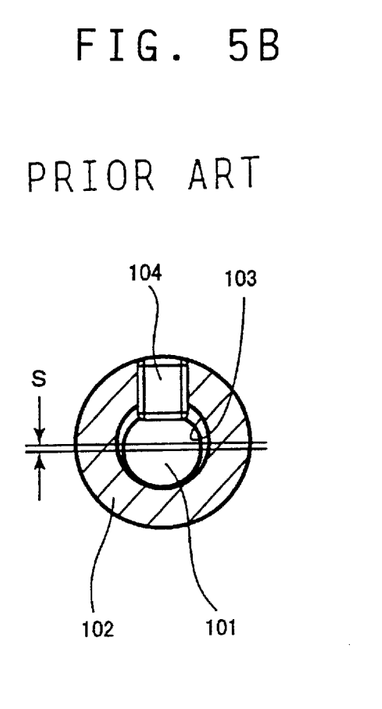

FIG. 5A is a sectional view of the joint portion with a collet holder, and FIG. 5B shows a section along X—X line of FIG. 5A. In FIG. 5A, a ball end mill body 100 has its shank 101 inserted in a clamp hole of a collet holder 102 and fixed by a set bolt 104. But the shank 101 is pushed to one side of the clamp hole 103 by the set bolt 104 as shown in FIG. 5B, so that the axis of the ball end mill body 100 is offset by a distance S. Even if the offset amount S is as small as several micrometers, it is multiplied when measured from the axis of the collet holder 102. Thus, this arrangement is not suitable for high-precision machining for forming ball grooves.

An object of the present invention is to improve the surface roughness Rz of a cut surface to 1.6 μm or less in cutting hardened steel by use of a polycrystalline hard sintered member, i.e. to achieve excellent finished surface roughness and high dimensional accuracy by improving the shape and surface roughness of a cutting edge of a cutting tool made of polycrystalline hard sintered material containing cubic boron nitride. Rz indicates a 10-point average roughness specified in JIS B0601 "Surface roughness—definition and indication".

Further, in order to achieve such dimensional accuracy, it is necessary to improve a means for coupling the ball end mill body with a collet holder. If shrink fit joint is used for coupling, a material which is high in rigidity and small in thermal expansion coefficient should be used for the shank portion.

SUMMARY OF THE INVENTION

A polycrystalline hard sintered material containing 20–95 vol % of cubic boron nitride is used as the cutting blade of a ball end mill. The cutting edge ridge is subjected to honing to a radius of curvature of 5 to 30 μm. A flank and a rake face or a negative land of the cutting blade smoothly connect with the ridge with the radius of curvature. The ridge of the cutting blade has a surface roughness of 0.1 to 1.0 μm in terms of 10-point average roughness (Rz).

Preferably, the flank and the rake face or the negative land of the cutting blade has a surface roughness of 0.1–0.5 μm in terms of 10-point average roughness (Rz). The wedge angle between the flank and the rake face or between the flank and the negative land is preferably 65° to 125°.

As the polycrystalline hard sintered material, one containing 20 to 95 vol % of cubic boron nitride and having an average particle diameter of 0.01 to 5 μm is preferable. A coating layer comprising at least one of a nitride, carbide, oxide and a solid solution thereof of at least one element selected from the group consisting of elements in the 4a, 5a and 6a groups of the periodic table and elements of Al, Si and B, or at least one of metal selected from the group is formed on the surface of the cutting blade by physical or chemical deposition.

A cemented carbide or a sintered superheavy alloy is used for the ball end mill body. The shank portion has such a shape as to be shrink-fit into a collet holder to minimize runout of the cutting blade and strongly join them together by utilizing the difference in thermal expansion coefficient between the shank portion and the collet holder.

Other features and objects of the present invention will become apparent from the following description made with reference to the accompanying drawings, in which:

DETAILED DESCRIPTION OF THE PREFERRED EMBODIMENT

As for the type of a ball end mill, if the accuracy as a cutting tool is important, a solid type in which the cutting blade and the body are integral, is preferable. If the function sharing of the cutting blade-fixing portion and the shank portion of the ball end mill body, and an economical aspect in view of wear of the cutting blades are important, the cutting blade may be formed on a separate indexable type, plate-shaped insert.

Figure 1A:
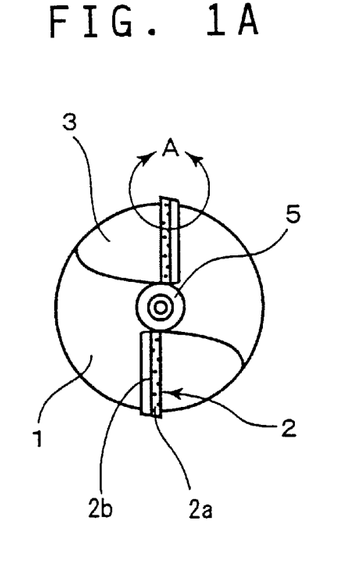
FIG. 1A is a front view of a ball end mill according to the present invention.
Figure 1B:
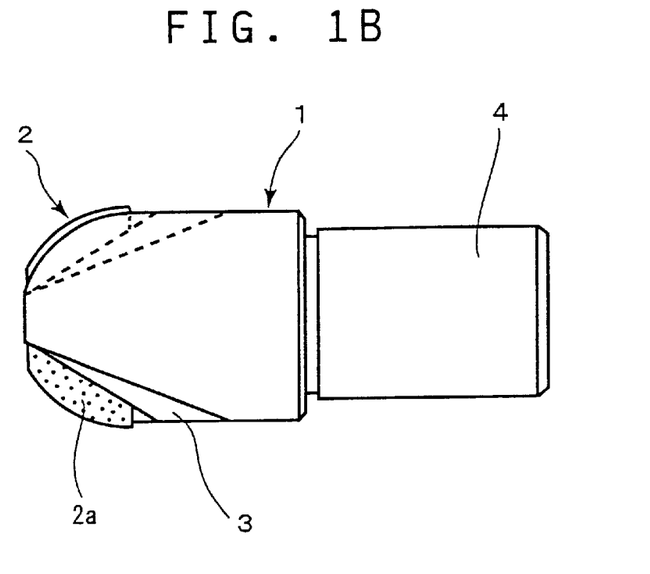
FIG. 1B is a side view of the same.

FIG. 1 shows a solid type ball end mill having cutting blades formed of polycrystalline hard sintered members. FIG. 1A is its front view and FIG. 1B is its side view.

In FIG. 1A, a ball end mill body 1 is formed of a sintered superheavy alloy formed by sintering a material powder containing 90–97 wt % of a cemented carbide or tungsten, the balance being Co, Ni, Fe and Cu. Since a sintered superheavy alloy has a longitudinal modulus of 280–370 GPa and a high rigidity, and a smaller thermal expansion coefficient than steel, a sufficient interference is ensured if the ball end mill is shrink fit in a collet holder (not shown). A cutting blade 2 has a two-layer structure in which a polycrystalline hard sintered body 2a and a base metal 2b of a cemented carbide are integrated together. The cutting blades 2 are brazed to the ball end mill body 1. Chip pockets 3 are formed in the ball end mill body 1.

In FIG. 1B, the cutting blades 2 are brazed to the ball end mill body 1. A shank portion 4 is joined to a collet holder (not shown) by shrink fit. With a shank portion 4 having this shape, the problems explained with respect to the side lock type in the prior art will not arise. Using a centering hole 5 shown in FIG. 1A, grinding of the cutting edge is easily possible with high accuracy.

Figure 2:
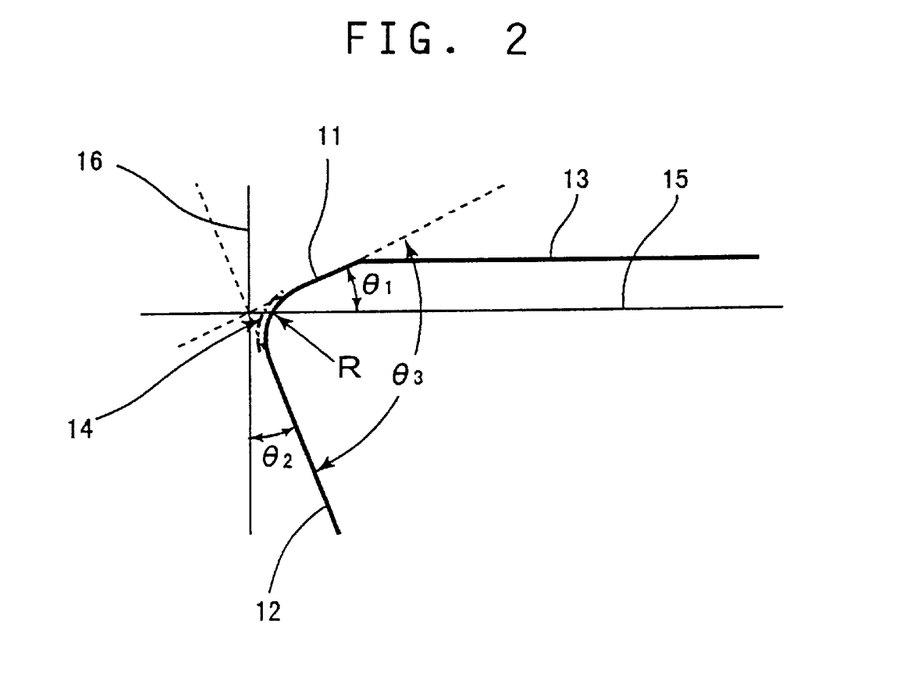
FIG. 2 is an enlarged view of a cutting blade having a negative land according to the present invention.

Next, with reference to FIGS. 2 and 3 in which cutting blade portion A of FIG. 1A is enlarged, technical terms about the cutting blade will be explained. FIG. 2 is an enlarged sectional view of the cutting blade which has a negative land 11. 12 is a flank, 13 is a rake face, and 14 is a ridge of the cutting edge. The ridge 14 of the cutting edge smoothly connects with the negative land 11 in FIG. 2, or with the rake face 13 and the flank 12 of FIG. 3 with a radius of curvature R. Smoothly connecting is synonymous with continuously connecting without any angle. The angle $\theta 1$ between a horizontal line 15, which is a reference line during cutting, and the negative land 11 is a rake angle, while the angle $\theta 2$ between a vertical line 16 and the flank 12 is an angle of relief. The angle $\theta 3$ between the negative land 11 and the flank 12 is a wedge angle of the cutting edge. In FIG. 2, the rake angle $\theta 1$ is negative, while in FIG. 3, the rake angle $\theta 1$ is positive and there is no negative land.

Figure 3:
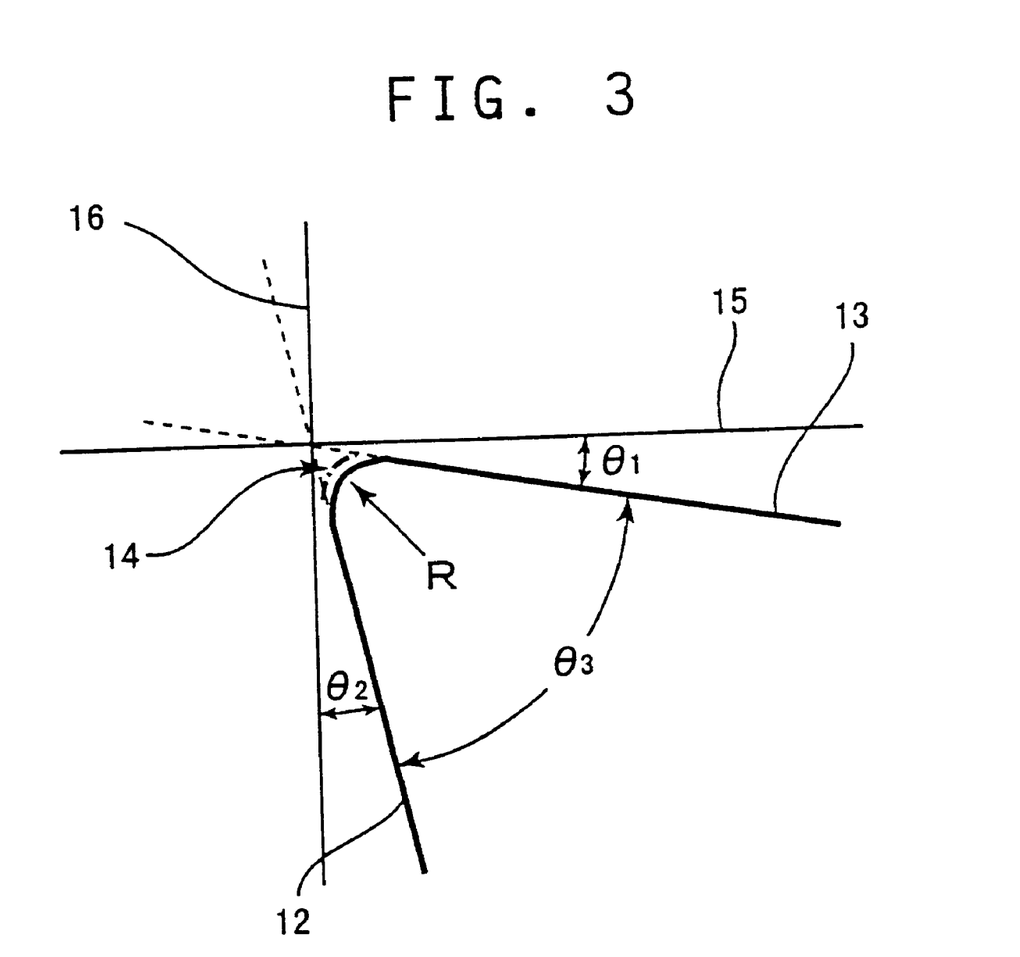
FIG. 3 is an enlarged view of a cutting blade having no negative land according to the present invention.

The ridge 14 of the cutting edge is formed at a portion where the flank 12 and the rake face 13 of FIG. 3, or the flank 12 and the negative land 11 of FIG. 2 meet or intersect. The radius of curvature R and surface roughness of the ridge 14 of the cutting edge are especially important. That is to say, it is important that the ridge 14 of the cutting edge be formed by a curve having a radius of curvature of 5–30 $\mu$m and the curve smoothly connects with the flank 12, rake face 13, and negative land 11. Also, by restricting the surface roughness of the ridge 14 of the cutting edge within the range of 0.1–1 $\mu$m in 10-point average roughness (Rz), it is possible to achieve excellent finished surface roughness and high-precision machining.

Heretofore, a cutting blade 2 made of a polycrystalline hard sintered material containing cubic boron nitride had its cutting edge formed by grinding the flank 12 and the rake face 13 or the flank 12 and the negative land 11 using a diamond grinder containing diamond particles having a particle diameter of about #600. But with cutting blades 2 having their cutting edges formed by this method, the ridge 14 of the cutting edge was often subjected to severe chipping.

If a high-hardness material such as hardened steel is cut by use of a cutting blade made of a cubic boron nitride sintered material, the shape of the ridge 14 of the cutting edge tends to be transferred onto the surface of the workpiece. Thus, in order to finish a high-hardness material to excellent finished surface roughness, it is necessary to form the ridge 14 of the cutting edge to smooth and fine surface roughness with no chipping of the cubic boron nitride sintered material. If the cutting force is high, so-called chattering tends to occur on the surface of the workpiece. Thus, in order to solve the problem of the present invention, it is important firstly to smoothen the surface roughness of the ridge 14 of the cutting edge and secondly to reduce the cutting force.

A cutting blade 2 having a ridge 14 of the cutting edge that is small in surface roughness can be formed by a diamond grinder having fine diamond particles having a particle diameter of about #3000–#4000 though much time and trouble are required. But it was difficult to smoothly connect the ridge 14 of the cutting edge with the flank 12 and the rake face 13, or with the negative land 11.

The cutting blade made of a polycrystalline sintered material according to the present invention has its cutting edge formed by grinding the flank 12 and the rake face 13 or the negative land 11 by use of a diamond grinder having a diamond particle diameter of about #600–#3000. Also, it has been found out that it is effective to hone the portion near the thus formed cutting edge with a rotary brush to which diamond abrasive particles having a particle diameter of about #1500–#3000 is applied. By smoothly connecting the ridge 14 of the cutting edge with the flank 12 and the rake face 13 or with the negative land 11, chip can be smoothly discharged. Also, it is possible to improve the surface roughness of the finished surface by decreasing the surface roughness of the ridge 14 of the cutting edge.

Next, in order to lower the cutting force, reducing the radius of curvature R of the ridge 14 of the cutting edge has been studied. During the study, it has been found out that if the radius of curvature is too small, it is industrially infeasible to obtain the target surface roughness. This is because with too small a radius of curvature, it is impossible to smoothen recesses at chipped portions.

As a result of trial cutting, it has been found out that if the radius of curvature R is within the range of 5–30$\mu$m, the cutting force decreases. If it exceeds 30 $\mu$m, since the rake angle $\theta 1$ increases in the negative direction, the cutting force increases, so that sharpness of cutting drops during machining. Especially in machining a high-hardness material with high accuracy, the thrust force is high and its fluctuation is large. Thus it is difficult to obtain high dimensional accuracy.

Heretofore, ordinary surface roughness of the finished surface of a high-hardness material obtained by grinding was about 1.6 $\mu$m in terms of 10-point average roughness (Rz). In order to achieve such a surface roughness by cutting, it has been found out that the surface roughness of the ridge 14 of the cutting edge should preferably be 1.0 $\mu$m or under in terms of 10-point average roughness (Rz). Also, it has been confirmed that even if the surface roughness of the ridge 14 of the cutting edge is finished to less than 0.1 $\mu$m, its effect saturates, so that it is of no use from an economical viewpoint. Thus, the surface roughness of the ridge 14 of the cutting edge should be within the range of 0.1 to 1.0 $\mu$m in 10-point average roughness (Rz).

Since the cutting edge gets worn as machining progresses, the ridge 14 of the cutting edge regresses. The newly formed ridge 14 is formed by the worn flank 12 and rake face 13 or negative land. Thus, in order to maintain good surface roughness and prevent crator wear and wear of the flank during machining, it is necessary that the flank 12 and rake face 13 or negative land 11 is as smooth as possible. Thus, the flank 12 and rake face 13 or negative land 11 has preferably a surface roughness of 0.1 to 0.5 μm in 10-point average roughness (Rz).

On the other hand, in order to machine a high-hardness material, high hardness is required for the material of cutting blades, too. The content of cubic boron nitride in the polycrystalline sintered body is preferably 20 to 95 vol %. Also, if only the hardness is taken into account, single-crystal cubic boron nitride, too, is considered to be suitable for the machining of high-hardness material. But in the case of single crystal, there is a problem that chipping due to cleavage tends to occur. Thus, it is preferable to use a polycrystalline boron nitride sintered material which is less likely to cleave.

Also, if the wedge angle θ3 between the flank 12 and the rake face 13 or between the flank 12 and the negative land 11 is less than 65°, during the initial stage of cutting of a high-hardness material, chipping tends to occur because of small wedge angle θ3. On the other hand, if the wedge angle θ3 exceeds 125°, although desired finished surface roughness is obtainable, it is impossible to obtain required dimensional accuracy. Thus, the wedge angle θ3 between the flank 12 and the rake face 13 or between the flank 12 and the negative land 11 is preferably 65 to 125°.

Further, in order to restrict the surface roughness of the ridge 14 of the cutting edge to 0.1 to 1.0 μm in 10-point average roughness (Rz), the cubic boron nitride contained has preferably an average particle diameter of 0.01 to 5 μm. If less than 0.01 μm, aggregations of fine particles tend to be produced in the sintered body, and chipping of the cutting edge tends to occur. Thus, the average particle diameter of the cubic boron nitride should not be too small or too large, and preferably be 0.01 to 5 μm.

Also, it is preferable to form a coating layer on the surface of the cutting blade by physical or chemical deposition to improve wear resistance and adhesion resistance. The coating layer comprises at least one compound selected from a nitride, carbide, oxide and a solid solution thereof of at least one element selected from the group consisting of elements in the 4a, 5a and 6a groups in the periodic table and Al, Si and B, or at least one of metal selected from the group.

Also, for the base metal to which is bonded a polycrystalline sintered member, cemented carbide or steel is used. In order to machine a high-hardness material with high accuracy, it is required that the base metal also has high rigidity. Thus, as the material of the base metal, cemented carbide, a sintered superheavy alloy or the like should be selected.

EXAMPLES

Examples of the ball end mill according to the present invention will be described below.

Example 1

In order to examine the influence of the radius of curvature and surface roughness of the ridge of a cutting blade formed of a polycrystalline hard sintered material containing cubic boron nitride on the finished surface roughness of the workpiece and the machining accuracy, ball end mills made of polycrystalline hard sintered materials containing cubic boron nitride shown in Table 1 were prepared.

The ball end mills in Table 1 are a solid type in which the cutting blades are integral with the ball end mill body as shown in FIG. 1. The cutting blades 2 comprise a polycrystalline hard sintered member 2a containing 50 vol % of cubic boron nitride having an average particle diameter of 0.5 to 1 μm. The cutting blades 2 were bonded to a base metal 2b and brazed to corner portions as shown in FIG. 1. Grinding for forming cutting edges was carried out by use of a #1000 diamond grinder. Thereafter, free diamond abrasive grains having a particle diameter of 5 to 8 μm (equivalent to #2000) were applied to the surface of a rotary brush and by pressing it against the rake face of each cutting blade 2, the ridge was subjected to honing. At this time, by changing the machining time, specimens were prepared which had different radius of curvature of the cutting edge ridge. For any of the specimens, the wedge angle of cutting edge was 83°.

The radius of curvature of the cutting edge ridge was measured using a contour measuring instrument. The measuring principle of the contour measuring instrument is the same as that of a surface roughness measuring instrument. It measures the curvature of a curve by making the measuring longitudinal magnifying power and the lateral magnifying power equivalent to each other. In the measurement of the surface roughness of ridge of the cutting edge of each specimen, although a knife edge-like probe was pressed on the cutting edge ridge at a right angle, it was impossible to take a sufficient measuring distance. Thus, measurement was made under the following conditions with the cut-off value set at 0.08 mm and the measuring length at 1.0 mm.

Shape of probe of a roughness measuring instrument: knife edge-like probe
  Measuring length: 1 mm
  Probe feed rate: 0.03 mm/sec
  Cut-off value: 0.08 mm
  Measuring longitudinal magnifying power: 20000-fold
  Measuring lateral magnifying power: 100-fold For specimen 1A, in which the radius of curvature of the cutting edge ridge was small, it was impossible to sufficiently remove by honing chipping produced at the cutting edge ridge during machining of the rake face or the flank. Thus the surface roughness was markedly large. For these five specimens, cutting test was conducted under the conditions shown below.

Figure 4:
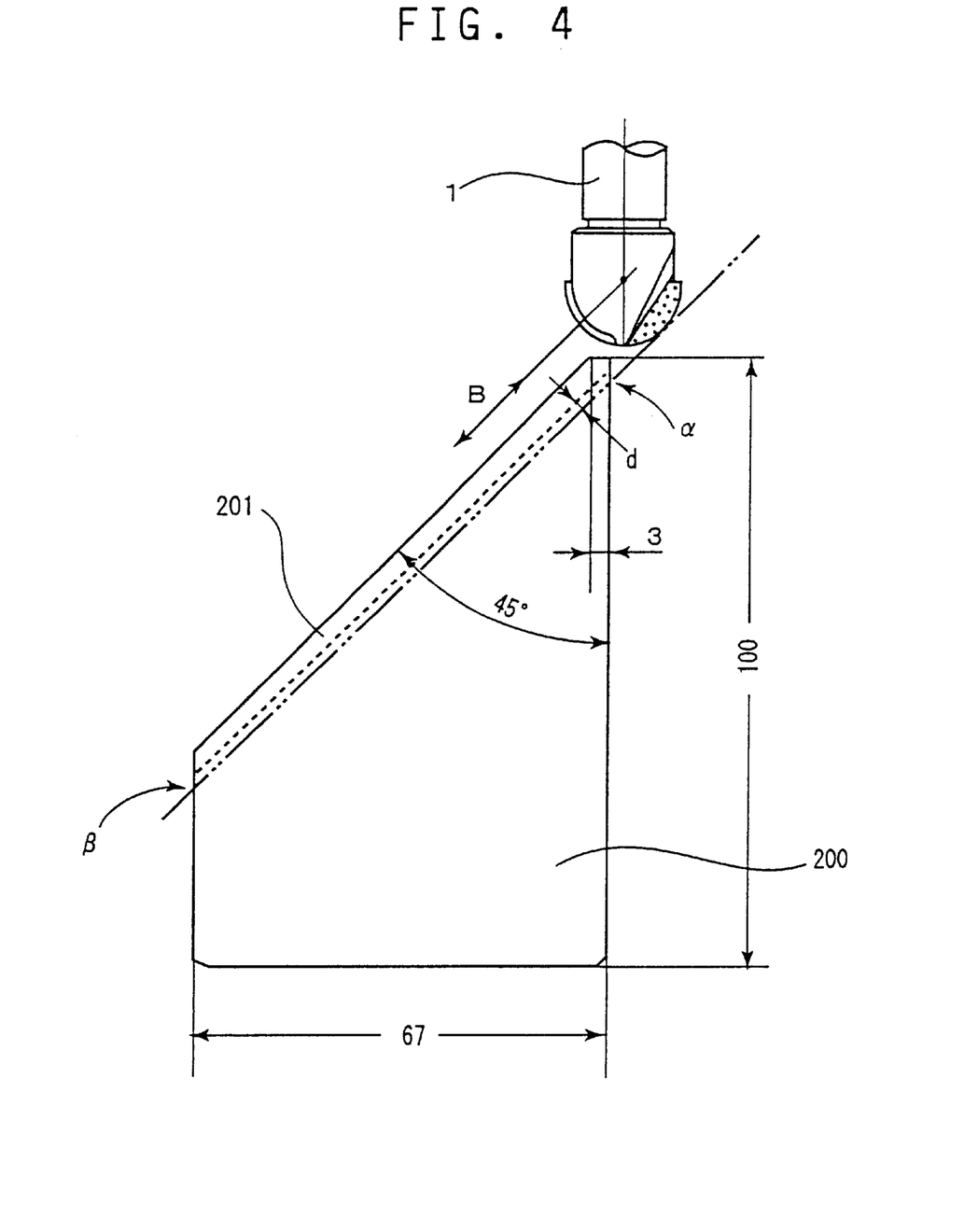
FIG. 4 is a view showing the shape and dimensions of a workpiece.

FIG. 4 shows the shape and dimensions of a workpiece 200, which was carburized steel (SCM415), carburized to a hardness HRC60. In its inclined surface, five ball grooves 201 having a radius of 10 mm were formed. Table 2 shows the finished surface roughness after the ball end mill body 1 has been linearly reciprocated by four passes, each pass extending from point α to point β, for each groove. Details of the cutting conditions are shown below.
  Cutting speed: 250 m/min
  Depth of cut d: 0.2 mm
  Feed rate: 0.2 mm/rev
  Number of grooves cut: 5
  Number of blades of the ball end mill: 2
  Target finished surface roughness of workpiece:
    Rz=1.2 μm or under For specimen 1A, which was small in the radius of curvature of the cutting edge ridge, since the surface roughness of the ridge was large, it was transferred to the workpiece and so the finished surface roughness was large. Thus, it was impossible to obtain the desired surface roughness. On the other hand, for specimen 1E, which was large in the radius of curvature of the ridge, although the surface roughness at the ridge was small, due to large cutting force, load fluctuation was marked and chattering occurred partially. Thus the target finished surface roughness was not obtained.

In contrast, for specimens 1B–1D, which are within the scope of the present invention, since the surface roughness of the cutting edge ridge was small, excellent finished surface roughness was obtained. Besides, it was found out that since the radius of curvature at the ridge was small, an increase in the cutting force was suppressed, so that no chattering occurred and precision machining was possible.

Example 2

In order to examine the influence of the roughness of the rake face of a cutting blade formed of a polycrystalline hard sintered material containing cubic boron nitride and the roughness of the cutting edge ridge on the finished surface roughness of the workpiece, ball end mills made of polycrystalline hard sintered materials containing cubic boron nitride shown in Table 3 were prepared.

The ball end mills in Table 3 were a solid type as shown in FIG. 1. The cutting blades 2 had a polycrystalline hard sintered member 2a containing 65 vol % of cubic boron nitride having an average particle diameter of 1 to 3 μm and integrated with the base metal 2b and brazed to corner portions as shown in FIG. 1. Grinding for the formation of cutting edges was carried out by use of a #1200 diamond grinding wheel.

Thereafter, for specimen 2A, honing was performed on the cutting edge by pressing a wire brush in which was buried diamond abrasive grains equivalent to #800 against the cutting edge while rotating it. For specimen 2B, free diamond abrasive grains having a particle diameter of 8 to 16 μm (equivalent to #1500) were applied to the surface of a rotary brush, and by pressing the brush against the rake face of each cutting blade 2, the cutting edge was subjected to honing. For specimen 2C, as with 2B, free diamond abrasive grains having a particle diameter of 5 to 8 μm (equivalent to #2000) were applied to the surface of the brush, and the cutting edge was subjected to honing by use of the brush. For any of the specimens, the wedge angle was 115°.

Thereafter, in the same manner as in Example 1, the roughness of the cutting edge of each specimen was measured. Measurement of the surface roughness of the rake face was carried out by pressing a needle-like probe on the rake face at a right angle with the cut-off value set at 0.08 mm and the measuring length at 1.0 mm under the following conditions:

Shape of roughness meter probe: needle-like probe
Measuring length: 1 mm
Probe feed rate; 0.03 mm/sec
Cut-off value: 0.08 mm
Measuring longitudinal magnifying power: 20000-fold
Measuring lateral magnifying power: 100-fold For specimen 2A, in which the cutting edges were subjected to honing by use of a diamond wire brush having a relatively coarse particle diameter, the effect of improving the roughness of the rake face and the flank was low. Also, the surface roughness of the ridge was large. For these three specimens, cutting test was conducted under the conditions shown below.

For the material, shape and dimensions of the workpiece, one similar to that of FIG. 4 was used. In the inclined surface, 15 ball grooves 201 having a radius of 10 mm were formed. Table 5 shows the finished surface roughness after the first and 60th pass when the ball end mill was linearly reciprocated in the direction of arrow B by four passes, each pass extending from point α to point β, for each groove. The cutting conditions are shown below.

Cutting speed: 200 m/min
Depth of cut d: 0.15 mm
Feed rate: 0.2 mm/rev
Number of grooves cut: 15
Number of blades of the ball end mill: 2
Target finished surface roughness of workpiece:
Rz=1.2 μm or under For specimen 2A, since the surface roughness of the ridge was large and this was transferred onto the surface of the workpiece, it was impossible to obtain the required surface roughness from the initial stage of cutting to its end. In contrast, for specimens 2B and 2C, in which the surface roughness of the ridge was small, an excellent finished surface roughness was obtained from the initial stage of cutting. Thus it was possible to ensure the required surface roughness.

Example 3

For cutting blades of polycrystalline hard sintered material containing cubic boron nitride, in order to examine the influence of the average particle diameter of the cubic boron nirtride on the roughness of the cutting edge ridge and the finished surface roughness of the workpiece, ball end mills made of polycrystalline hard sintered materials containing cubic boron nitride shown in Table 5 were prepared.

The ball end mills in Table 5 were a solid type as shown in FIG. 1. The cutting blades 2 had a polycrystalline hard sintered member 2a containing 55 vol % of cubic boron nitride having an average particle diameter of 1 to 3 μm and integrated with the base metal 2b and brazed to corner portions as shown in FIG. 1. Grinding for the formation of cutting edges was carried out by use of a #1000 diamond grinding wheel. Thereafter, the cutting edge was subjected to honing in the same manner as in Example 1. The wedge angle of cutting blade was 108°.

In Table 5, for specimen 3A in which the average particle diameter of the cubic boron nitride was very small, because of the existence of an uneven structure resulting from aggregation of fine particles in the sintered material, the cutting edge strength was so low that it was liable to chipping. For specimens 3B–3F in which no chipping occurred, a cutting test was conducted under the conditions shown below.

For the material, shape and dimensions of the workpiece, one similar to that of FIG. 4 was used. In the inclined surface, 10 ball grooves 201 having a radius of 10 mm were formed. Table 6 shows the finished surface roughness after the ball end mill body 1 was linearly reciprocated in the direction of arrow B by four passes, each pass extending from point α to point β, for each groove. Details of the cutting conditions are shown below.

Cutting speed: 250 m/min
Depth of cut d: 0.2 mm
Feed rate: 0.3 mm/rev
Number of grooves cut: 10
Number of blades of the ball end mill: 4
Target finished surface roughness of workpiece:
Rz=1.2 μm or under For specimen 3A in which the average particle diameter of the cubic boron nitride was large, since the roughness of the ridge was large, it was impossible to ensure the required finished surface roughness of the workpiece. In contrast, for specimens 3B–3E, which were within the scope of the present invention, since the roughness of the cutting edge ridge was small, it was found out that it was possible to stably ensure the required finished surface roughness and to perform high-precision machining.

Example 4

In cutting blades of polycrystalline hard sintered material containing cubic boron nitride, in order to examine the influence of the wedge angle, which is the angle between the flank and the negative land, on the machining accuracy and the finished surface roughness of the workpiece, ball end mills made of polycrystalline hard sintered materials containing cubic boron nitride shown in Table 7 were prepared.

The ball end mills in Table 7 were a solid type as shown in FIG. 1. The cutting blades 2 had a polycrystalline hard sintered member 2a containing cubic boron nitride having an average particle diameter of 1.2 μm by 70 vol % and bonded to the base metal 2b and brazed to corner portions as shown in FIG. 1. By combining different flanks and negative lands, six specimens having different wedge angles as shown in Table 7 were prepared. After grinding for forming the cutting edges by use of a #1500 diamond grinder, specimens 4A–4F, in which the radius of curvature of the cutting edge ridge was 28 μm, were prepared in the same manner as in Example 1. The surface roughness of the cutting edge ridge was 0.3 to 0.8 μm in terms of Rz.

For the material, shape and dimensions of the workpiece, one similar to that of FIG. 4 was used. In the inclined surface, five ball grooves 201 having a radius of 10 mm were formed. Table 8 shows the finished surface roughness after the ball end mill body 1 has been linearly reciprocated in the direction of arrow B by four passes, each pass extending from point α to point β, for each groove. Details of the cutting conditions are shown below.

Cutting speed: 230 m/min
Depth of cut d: 0.2 mm
Feed rate: 0.2 mm/rev
Number of grooves cut: 5
Number of blades of the ball end mill: 2
Target finished surface roughness of workpiece:
Rz=1.2 μm or under As will be apparent from the results of Table 8, for specimen 4A in which the wedge angle between the flank and the negative land was small, because of small wedge angle, the cutting force tended to fluctuate and thus chattering occurred though it did not affect practical use. Also, for specimen 4F which was large in the wedge angle, because of a large wedge angle, the cutting force was relatively large, so that chattering occurred though it did not affect practical use. In contrast, for specimens 4B–4E, which were within the scope of the present invention about the wedge angle, the cutting force was small and less likely to fluctuate, so that chattering did not occurred. Thus it was possible to achieve the target finished surface roughness.

Example 5

In order to confirm the effect on the finished surface roughness of the workpiece when a coating layer is formed on the cutting blade surface, ball end mills provided with a coating layer shown in Table 9 were prepared.

The ball end mills in Table 9 were a solid type as shown in FIG. 1. The cutting blades 2 had a polycrystalline hard sintered member 2a containing 65 vol % of cubic boron nitride having an average particle diameter of 1 to 3 μm and bonded to the base metal 2b and brazed to corner portions as shown in FIG. 1. For either specimen 5A, 5B, grinding for forming cutting edges was carried out by use of a #1200 diamond grinder so that the wedge angle would be 105° for either of them.

Further, free diamond abrasive grains having a particle diameter of 8 to 16 μm (equivalent to #1500) were applied to the surface of a rotary brush. By pressing the brush from the rake face of each cutting blade 2, the cutting edge ridge was subjected to honing to a radius of curvature of 15 μm. Thereafter, for specimen 5B, a coating layer of TiAlN having a thickness of 2 μm was formed on the surface of each cutting blade 2 by physical deposition. In the same manner as in Example 2, the roughness of the cutting edge ridge of each specimen was measured.

For these two specimens, cutting test was conducted under the conditions shown below.

Cutting speed: 200 m/min
Depth of cut d: 0.15 mm
Feed rate: 0.2 mm/rev
Number of grooves cut: 20
Number of blades of the ball end mill: 2
Target finished surface roughness of workpiece:
Rz=1.2 μm or under For the material, shape and dimensions of the workpiece, one similar to that of FIG. 4 was used. In the inclined surface, 20 ball grooves 201 having a radius of 10 mm were formed. Table 10 shows the finished surface roughness after the first and 80th pass when the ball end mill 1 was linearly reciprocated in the direction of arrow B by four passes, each pass being from point α to point β, for each groove. The results are shown in Table 10.

For both specimens, it was possible to obtain the required target finished surface roughness of the workpiece: Rz=1.2 μm. Specimen 5B was superior in the finished surface roughness both after the first pass and the 80th pass to specimen 5A. This is considered to be due to the adhesion resistance of the coating layer of TiAlN. By increasing the number of cutting passes, the effect of wear resistance also appears, so that it is possible to prolong the life of the tool.

For the ball end mill according to the present invention, in which the radius of curvature of the cutting edge ridge is 5 to 30 μm and the surface roughness of the cutting edge ridge is 0.1 to 1.0 μm, by modifying the shape and means for joining to a collet holder, it was possible to machine materials such as hardened steel and cast iron with high accuracy by cutting by minimizing runout of the cutting blades. That is to say, by using the ball end mill according to the present invention, it is possible to obtain a smooth finished surface, that is, a surface roughness of 1.6 μm or under. As a result, it was possible to dramatically improve the machining efficiency by replacing conventional less efficient grinding with cutting.

TABLE 1

|  | Specimen No. | Radius of curvature | Surface roughness of ridge (Rz) |
|---|---|---|---|
| Comparative example | 1A | 1 μm | 5.34 μm |
| Example | 1B | 5 μm | 0.97 μm |
|  | 1C | 15 μm | 0.85 μm |
|  | 1D | 30 μm | 0.63 μm |

TABLE 1-continued

| | Specimen No. | Radius of curvature | Surface roughness of ridge (Rz) |
|---|---|---|---|
| Comparative example | 1E | 40 μm | 0.49 μm |

TABLE 2

| | Specimen No. | Surface roughness (Rz) of ball groove after 20th pass |
|---|---|---|
| Comparative example | 1A | 1.82 μm |
| Example | 1B | 0.91 μm |
| | 1C | 0.84 μm |
| | 1D | 0.57 μm |
| Comparative example | 1E | 1.52 μm |

TABLE 3

| | Specimen No. | Radius of curvature | Roughness of rake face (Rz) | Roughness of ridge (Rz) |
|---|---|---|---|---|
| Comparative example | 2A | 16 μm | 0.75 μm | 1.25 μm |
| Example | 2B | 16 μm | 0.38 μm | 0.52 μm |
| | 2C | 16 μm | 0.27 μm | 0.46 μm |

TABLE 4

| | Specimen No. | Surface roughness (Rz) of ball groove after 1st pass | Surface roughness (Rz) of ball groove after 60th pass |
|---|---|---|---|
| Comparative example | 2A | 2.10 μm | 1.87 μm |
| Example | 2B | 0.88 μm | 0.71 μm |
| | 2C | 0.67 μm | 0.53 μm |

TABLE 5

| | Specimen No. | Average particle diameter of cubic boron nitride particles | Roughness of ridge (Rz) |
|---|---|---|---|
| Comparative example | 3A | 0.004 μm | crack occured |
| Example | 3B | 0.01 μm | 0.23 μm |
| | 3C | 0.1 μm | 0.26 μm |
| | 3D | 1.0 μm | 0.31 μm |
| | 3E | 5.0 μm | 0.59 μm |
| Comparative example | 3F | 8.0 μm | 1.67 μm |

TABLE 6

| | Specimen No. | Surface roughness (Rz) of ball groove after 40th pass |
|---|---|---|
| Example | 3B | 0.75 μm |
| | 3C | 0.81 μm |
| | 3D | 0.88 μm |
| | 3E | 0.92 μm |
| Comparative example | 3F | 1.67 μm |

TABLE 7

| Specimen No. | Angle of relief | Negative land angle | Wedge angle |
|---|---|---|---|
| 4A | 30° | 0° | 60° |
| 4B | 25° | 0° | 65° |
| 4C | 15° | 15° | 90° |
| 4D | 10° | 20° | 100° |
| 4E | 10° | 45° | 125° |
| 4F | 10° | 50° | 130° |

TABLE 8

| Specimen No. | Surface roughness (Rz) of ball groove after 20th pass | Chatter occurred? |
|---|---|---|
| 4A | 1.55 μm | occurred |
| 4B | 0.93 μm | not occurred |
| 4C | 0.89 μm | not occurred |
| 4D | 0.81 μm | not occurred |
| 4E | 0.78 μm | not occurred |
| 4F | 1.43 μm | occurred |

TABLE 9

| Specimen No. | Coating layer | Roughness of ridge (Rz) |
|---|---|---|
| 5A | Not provided | 0.51 μm |
| 5B | TiAlN 2 μm thick | 0.50 μm |

TABLE 10

| Specimen No. | Surface roughness (Rz) of ball groove after 1st pass | Surface roughness (Rz) of ball groove after 80th pass |
|---|---|---|
| 5A | 0.37 μm | 0.73 μm |
| 5B | 0.82 μm | 0.68 μm |

What is claimed is:

1. A ball end mill comprising a cutting blade formed of a polycrystalline hard sintered material containing 20 to 95 vol % of cubic boron nitride,
   said cutting blade having a ridge formed into a curve having a radius of curvature of 5 to 30 μm,
   a flank and one of a rake face and a negative land of said cutting blade connecting smoothly with said ridge having said radius of curvature,
   said ridge having a ten point average surface roughness (Rz) of 0.1 to 1.0 μm.

2. The ball end mill as claimed in claim 1 wherein the flank and the one of the rake face and the negative land of said cutting blade have a ten point average surface roughness (Rz) of 0.1 to 0.5 μm.

3. The ball end mill as claimed in claim 1 wherein the wedge angle between the flank and the one of the rake face and the negative land of said cutting blade is 65° to 125°.

4. The ball end mill as claimed in claim 1 wherein said polycrystalline hard sintered material contains 20 to 95 vol % of cubic boron nitride, said cubic boron nitride having an average particle diameter of 0.01 to 5 μm.

5. The ball end mill as claimed in claim 1 wherein a coating layer is formed on the surface of said cutting blade, said coating layer comprising at least one compound selected from a nitride, carbide, oxide and a solid solution thereof of at least one element selected from the group consisting of elements in the 4a, 5a and 6a groups in the periodic table and Al, Si and B, or at least one of the metals selected from said group.

6. The ball end mill as claimed in claim 1, further comprising a ball end mill body to which the cutting blade is affixed, the ball end mill body being formed of one of a cemented carbide and a sintered superheavy alloy, and having a shank portion that has such a shape as to be shrink fitted into a collet holder.

7. The ball end mill as claimed in claim 2 wherein the wedge angle between the flank and the one of the rake face and the negative land of said cutting blade is 65° to 125°.

8. The ball end mill as claimed in claim 2 wherein a coating layer is formed on the surface of said cutting blade, said coating layer comprising at least one compound selected from a nitride, carbide, oxide and a solid solution thereof of at least one element selected from the group consisting of elements in the 4a, 5a and 6a groups in the periodic table and Al, Si and B, or at least one of the metals selected from said group.

9. The ball end mill as claimed in claim 3 wherein a coating layer is formed on the surface of said cutting blade, said coating layer comprising at least one compound selected from a nitride, carbide, oxide and a solid solution thereof of at least one element selected from the group consisting of elements in the 4a, 5a and 6a groups in the periodic table and Al, Si and B, or at least one of the metals selected from said group.

10. The ball end mill as claimed in claim 4 wherein a coating layer is formed on the surface of said cutting blade, said coating layer comprising at least one compound selected from a nitride, carbide, oxide and a solid solution thereof of at least one element selected from the group consisting of elements in the 4a, 5a and 6a groups in the periodic table and Al, Si and B, or at least one of the metals selected from said group.

11. The ball end mill as claimed in claim 7 wherein a coating layer is formed on the surface of said cutting blade, said coating layer comprising at least one compound selected from a nitride, carbide, oxide and a solid solution thereof of at least one element selected from the group consisting of elements in the 4a, 5a and 6a groups in the periodic table and Al, Si and B, or at least one of the metals selected from said group.

12. The ball end mill as claimed in claim 2, further comprising a ball end mill body to which the cutting blade is affixed, the ball end mill body being formed of one of a cemented carbide and a sintered superheavy alloy, and having a shank portion that has such a shape as to be shrink fitted into a collet holder.

13. The ball end mill as claimed in claim 3, further comprising a ball end mill body to which the cutting blade is affixed, the ball end mill body being formed of one of a cemented carbide and a sintered superheavy alloy, and having a shank portion that has such a shape as to be shrink fitted into a collet holder.

14. The ball end mill as claimed in claim 4, further comprising a ball end mill body to which the cutting blade is affixed, the ball end mill body being formed of one of a cemented carbide and a sintered superheavy alloy, and having a shank portion that has such a shape as to be shrink fitted into a collet holder.

15. The ball end mill as claimed in claim 5, further comprising a ball end mill body to which the cutting blade is affixed, the ball end mill body being formed of one of a cemented carbide and a sintered superheavy alloy, and having a shank portion that has such a shape as to be shrink fitted into a collet holder.

16. The ball end mill as claimed in claim 7, further comprising a ball end mill body to which the cutting blade is affixed, the ball end mill body being formed of one of a cemented carbide and a sintered superheavy alloy, and having a shank portion that has such a shape as to be shrink fitted into a collet holder.

17. The ball end mill as claimed in claim 8, further comprising a ball end mill body to which the cutting blade is affixed, the ball end mill body being formed of one of a cemented carbide and a sintered superheavy alloy, and having a shank portion that has such a shape as to be shrink fitted into a collet holder.

18. The ball end mill as claimed in claim 9, further comprising a ball end mill body to which the cutting blade is affixed, the ball end mill body being formed of one of a cemented carbide and a sintered superheavy alloy, and having a shank portion that has such a shape as to be shrink fitted into a collet holder.

19. The ball end mill as claimed in claim 10, further comprising a ball end mill body to which the cutting blade is affixed, the ball end mill body being formed of one of a cemented carbide and a sintered superheavy alloy, and having a shank portion that has such a shape as to be shrink fitted into a collet holder.

20. The ball end mill as claimed in claim 11, further comprising a ball end mill body to which the cutting blade is affixed, the ball end mill body being formed of one of a cemented carbide and a sintered superheavy alloy, and having a shank portion that has such a shape as to be shrink fitted into a collet holder.

\* \* \* \* \*